(12) United States Patent
Sood et al.

(10) Patent No.: US 11,425,632 B2
(45) Date of Patent: Aug. 23, 2022

(54) MECHANISM TO PROVIDE UPDATES TO NB-IOT DEVICES

(71) Applicant: T-MOBILE USA, INC., Bellevue, WA (US)

(72) Inventors: Romil Sood, Bellevue, WA (US); Kyeong Hun An, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 128 days.

(21) Appl. No.: 16/923,560

(22) Filed: Jul. 8, 2020

(65) Prior Publication Data
US 2022/0015016 A1    Jan. 13, 2022

(51) Int. Cl.
  *H04W 48/14*    (2009.01)
  *G16Y 30/00*    (2020.01)
  *H04W 84/18*    (2009.01)

(52) U.S. Cl.
  CPC ............. *H04W 48/14* (2013.01); *G16Y 30/00* (2020.01); *H04W 84/18* (2013.01)

(58) Field of Classification Search
  None
  See application file for complete search history.

(56) References Cited

U.S. PATENT DOCUMENTS

| 11,089,534 B2 * | 8/2021 | Jun | H04W 8/18 |
| 2020/0301693 A1 * | 9/2020 | Patel | H04W 4/70 |

FOREIGN PATENT DOCUMENTS

| EP | 3557896 A1 * | 10/2019 | ............ H04W 8/245 |

* cited by examiner

*Primary Examiner* — Hong S Cho
(74) *Attorney, Agent, or Firm* — Marshall, Gerstein & Borun LLP (57) ABSTRACT

Systems and methods for over-the-air (OTA) updating of data stored on Narrowband Internet of Things (NB-IoT) devices are provided. Such techniques enable updates to be provided on a timely basis for NB-IoT devices that lack short message service (SMS) capabilities, through polling an OTA update server in response to the occurrence of triggering events at the NB-IoT devices. Triggering events may be identified based upon conditions such as time since a previous update attempt or number of times the NB-IoT device has awoken since the previous update attempt. The updates may include updates to network lists used by the NB-IoT devices to determine preferred or forbidden networks, thereby reducing battery drain from repeated attempts to connect to inaccessible networks.

17 Claims, 4 Drawing Sheets

MECHANISM TO PROVIDE UPDATES TO NB-IOT DEVICES

FIELD OF THE DISCLOSURE

The present disclosure relates to providing over-the-air (OTA) updates for Narrowband Internet of Things (NB-IoT) devices via mobile telecommunications networks.

BACKGROUND

In recent years, Internet of Things (IoT) devices have proliferated in a variety of settings to provide industrial, scientific, medical, infrastructure, communication, consumer, and other types of data. Some IoT devices measure physical or network conditions at their locations, while other IoT devices receive commands and implement local control functions (e.g., allowing remote operation or optimization of industrial processes or smart devices). While many IoT devices remain in fixed locations for long durations, other IoT devices change locations frequently. Thus, some IoT devices rely on internal power sources to remain operational for extended intervals, sometimes operating for years in inaccessible locations using battery power without being serviced. Some types of IoT devices, such as NB-IoT devices, must therefore be optimized for both mobile telecommunications and low power consumption. NB-IoT devices are particularly optimized for low-power operation over long periods of time, using short bursts of low-overhead telecommunications messages. Because of this, the communications capabilities of NB-IoT devices are severely limited. Thus, NB-IoT devices do not use at least some of the more robust mobile telecommunications network functionalities used by less constrained types of wireless devices (e.g., smartphones or tablet computers).

Without full access to robust wireless telecommunications network functions such as short message service (SMS), NB-IoT devices lack adequate updating techniques. Since such NB-IoT devices may be installed at remote locations that are difficult to access, manual processes of physical replacement or updating by technicians are expensive and inefficient. Therefore, power-efficient OTA updating techniques are needed for provisioning software updates to deployed NB-IoT devices.

SUMMARY

The present invention solves the problem of providing over-the-air (OTA) updates to Narrowband Internet-of-Things (NB-IOT) devices in a power-efficient manner, without requiring the use of short message service (SMS) communications. Thus, a low-power process for OTA updating geographically dispersed NB-IoT devices is provided, which is capable of using less data-intensive user datagram protocol (UDP) communication over mobile telecommunications networks. Such techniques are particularly advantageous for NB-IoT devices, which are designed to extend battery life through power consumption limitations and have low data rates for wireless communication. Because the techniques described herein do not use SMS communication, the NB-IoT devices may be configured without an SMS interface capable of communication with an SMS center (SMSC).

The disclosure herein generally relates to systems, methods, and non-transitory computer-readable media storing instructions for OTA updating of NB-IoT devices over mobile telecommunications networks. The systems, methods, and instructions disclosed herein may be implemented by NB-IoT devices according to instructions stored thereon, which may include instructions stored as an OTA update applet on a subscriber identity module (SIM) card. Such OTA update applet may be stored on the SIM card prior to provisioning the SIM card in the NB-IoT device to enable the NB-IoT device to perform the updating techniques disclosed herein.

The techniques described herein may include: determining occurrence of a triggering event at an NB-IoT device; accessing a network address of an OTA update server from a memory of the NB-IoT device; transmitting an update request message to the network address of the OTA update server from the NB-IoT device via a mobile telecommunications network; receiving an update message at the NB-IoT device via the mobile telecommunications network that contains update data from the OTA update server; and/or updating information stored in the memory of the NB-IoT device based upon the update data received from the OTA update server.

In some embodiments, determining the occurrence of the triggering event may include determining the NB-IoT device has awoken a predetermined number of times since transmission of a previous update request message. In further embodiments, the update request message may be generated following occurrence of the triggering event, such that the update request message includes one or more device parameters of the NB-IoT device to enable the OTA update server to determine whether an update is available for the NB-IoT device (e.g., based upon the type or operating status of the NB-IoT device). The one or more device parameters may be determined at the time of generating the update request message, or one or more of the device parameters may be determined prior to generating the update request message. In still further embodiments, the update information may include an update to a preferred network list or to a forbidden network list.

In additional embodiments, the OTA update server may receive the update request message via the mobile telecommunications network; determine an unapplied update is pending for the NB-IoT device based upon the update request message; and transmit the update message containing the update data to the NB-IoT device via the mobile telecommunications network. In some such embodiments, the OTA update server may determine the availability of updates for the NB-IoT device based upon device parameters included in the update request message.

Systems or computer-readable media storing instructions for implementing all or part of the methods described above may also be provided in some aspects. Such systems or computer-readable media may include executable instructions to cause one or more processors to implement part or all of the methods described above. Additional or alternative features described herein below may be included in some aspects.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature

DETAILED DESCRIPTION

The systems, methods, and techniques described herein solve the problem of providing over-the-air (OTA) updates to Narrowband Internet-of-Things (NB-IOT) devices. Existing OTA updating techniques that are used on other types of wireless computing devices (e.g., smartphones, tablet computers, or wearable computing devices) require more power or network function access than the capabilities and constraints of NB-IoT devices enable. For example, short message service (SMS) updating techniques require access to an SMS center via an SMS interface, which is typically lacking in NB-IoT devices and which would result in unacceptable power consumption. Therefore, a low-power technique of OTA updating for NB-IoT devices is disclosed herein. An applet or other software component installed in the memory of an NB-IoT device prior to deploying the device causes the device to poll an OTA update server upon occurrence of a triggering event at the device. When an update is available, the update is received by the NB-IoT device via one or more wireless messages from the OTA update server via a mobile telecommunications network. Additional, fewer, or alternative aspects may be included in various embodiments, as described herein.

Figure 1:
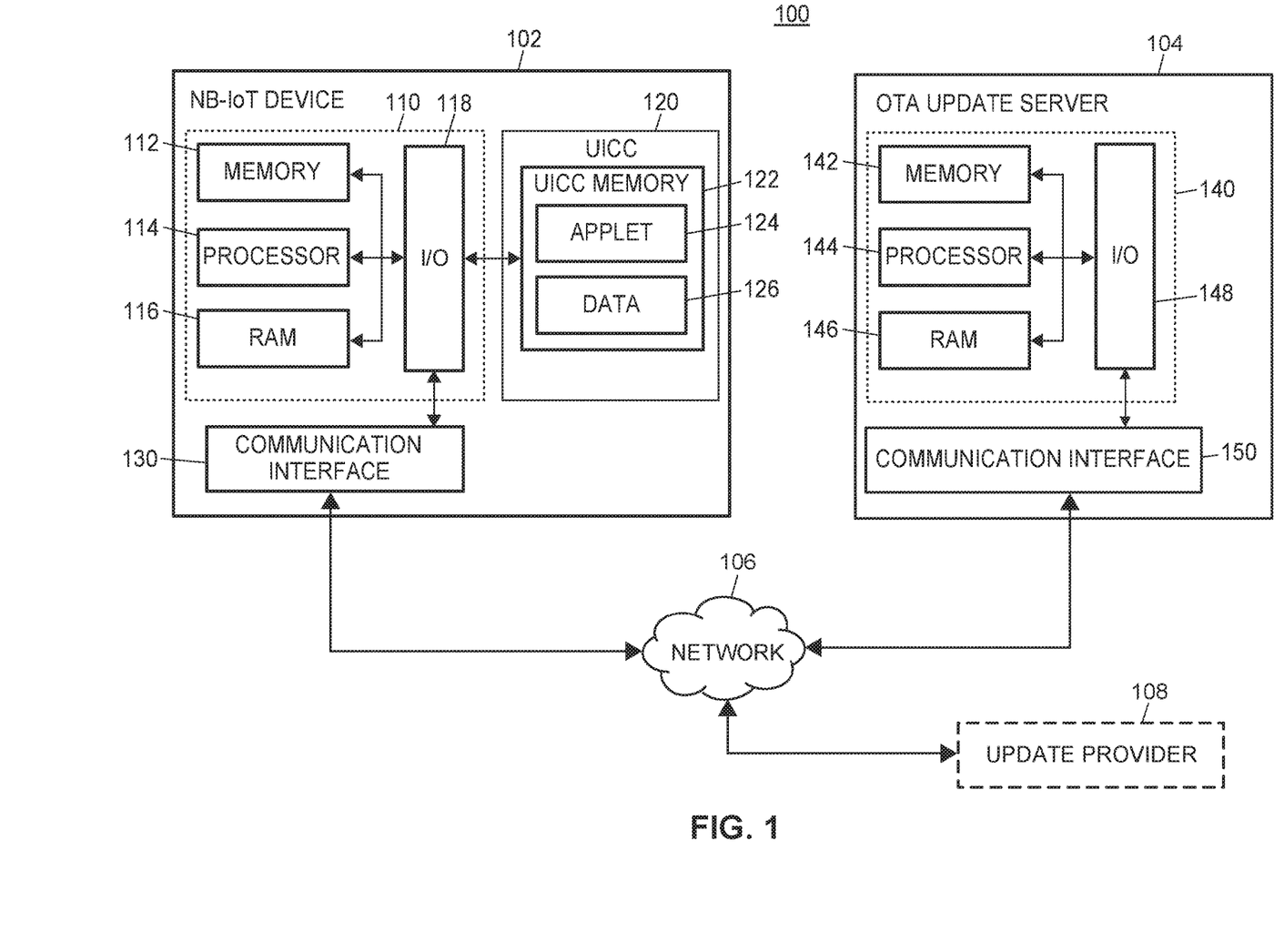
FIG. 1 illustrates a block diagram of an exemplary NB-IoT system, comprising an NB-IoT device and an OTA update server connected by a mobile telecommunications network.

FIG. 1 illustrates a block diagram of an exemplary NB-IoT system 100, comprising an NB-IoT device 102 and an OTA update server 104 connected by a mobile telecommunications network 106. The OTA update server 104 is configured to provide OTA updates to the NB-IoT device 102 via the mobile telecommunications network 106 in response to polling messages from the NB-IoT device 102. In some embodiments, the OTA update server 104 may receive update data from an additional update provider 108, which may be a computing device associated with a third party (e.g., a service provider or a manufacturer of the NB-IoT device 102).

The NB-IoT device 102 is a computing device configured for mobile communication within an IoT system, such as for collecting, relaying, transmitting, receiving, processing, storing, or applying data (e.g., to monitor conditions or control a process or additional device). Thus, the NB-IoT device 102 includes a controller 110 to receive, store, process, and output data. The controller 110 receives, processes, produces, transmits, and stores data. The controller 110 includes a memory 112 storing processor-executable instructions in a non-transitory medium, one or more processors 114 configured to execute computer-readable instructions, a random access memory (RAM) 116 for temporary memory, and an I/O circuit 118. The components of the controller 110 may be interconnected via an address/data bus or other means. It should be appreciated that although only one processor 114 is depicted, the controller 110 may include multiple processors 114 in some embodiments. Similarly, the controller 110 may include multiple RAMs 116 and multiple memories 112. Although the I/O circuit 218 is likewise depicted as a single block, the I/O circuit 118 may include a number of different I/O circuits, which may be configured for specific I/O operations. The processor 114 may include one or more processors of any known or hereafter developed type, including general-purpose processors or special-purpose processors. Similarly, the controller 110 may implement the RAM 116 and memory 112 as semiconductor memories, magnetically readable memories, optically readable memories, or any other type of memory.

To provide network connectivity over the mobile telecommunications network 106, the NB-IoT device 102 further includes a universal integrated circuit card (UICC) 120 and a communication interface 130. The UICC 120 is used to store parameters and other information identifying the subscriber to various services. The UICC 120 includes a UICC memory 122, which is a non-transitory memory configured to store electronic data, such as service parameters to enable the NB-IoT device 102 to access features or services of one or more mobile telecommunications networks. The UICC memory 122 may further store parameters for other networks or third party services, as well as processor-executable instructions to perform parts of the various processes described herein. Such UICC 120 may include subscriber identity module (SIM) or universal mobile telecommunications service (UMTS) SIM (USIM) applications to facilitate connectivity and OTA updating. In some embodiments, the UICC 120 may be a SIM card configured to store a subscriber identity and network connection parameters enabling the NB-IoT device 102 to connect to the mobile telecommunications network 106.

The UICC memory 122 may include one or more applets 124 and various data 126 for use by the NB-IoT device 102, including an OTA update applet 124 configured to perform OTA updating when executed by the controller 110 of the NB-IoT device 102 or data 126 relating to device parameters or network lists. In order to facilitate OTA updating, in some embodiments, the OTA update applet 124 is stored in the UICC memory 122 of the UICC 120 (e.g., a SIM card) prior to provisioning the UICC 120 in the NB-IoT device 102. Likewise, in some embodiments, the data 126 stored in the UICC memory 122 may include files or lists of network connection data, such as a list of preferred network partners (referred to as a Preferred Roaming List in some networks). Thus, the UICC data 126 may store one or more preferred network lists (e.g., a Public Land Mobile Network (PLMN) list) or forbidden network lists (e.g., a Forbidden PLMN (FPLMN) list). Such network lists may be used by the NB-IoT device 102 to connect to the mobile telecommunications network 106.

The NB-IoT device 102 is configured as a mobile telecommunications device with a communication interface 130 capable of sending and receiving data via the mobile telecommunications network 106. The communication interface 130 may include hardware and software components (e.g., encoding modules, decoding modules, and antennas) to transmit messages based up data received from the controller 110 or to provide received messages to the controller 110. The communication interface 130 may transmit and receive wireless communications with external devices via the mobile telecommunications network 106, using any suitable wireless communication network protocols. Furthermore, the communication interface 130 may provide input signals to the controller 110 via the I/O circuit 118.

The controller 110 of the NB-IoT device 102 may further be configured to communicate data through the communication interface 130 using any suitable data protocol. In contrast to some other types of mobile computing devices, however, NB-IoT devices 102 are configured with limited network function access. Thus, NB-IoT communication is not appropriate for SMS messaging, which is used by other types of devices for OTA updates to software and other data via mobile telecommunications networks. Although NB-IoT devices may be communicatively connected to other devices capable of SMS messaging, such arrangements increase complexity and are unsuitable for many situations. Thus, in some embodiments, the NB-IoT device 102 is configured without a SMS interface capable of communication with an SMSC.

In further embodiments, in order to maintain long battery life through reduced message size, the communication interface 130 is configured to communicate via user datagram protocol (UDP), rather than the more robust protocols such as transmission control protocol (TCP). Although UDP communication does not establish a connection with the recipient device and cannot ensure delivery of packets transmitted, it minimizes power consumption by reducing communication overhead associated with establishing and maintaining connections. Thus, UDP communication is often used for NB-IoT devices to extend battery life and improve transmission speed within the limits on the power and bandwidth in NB-IoT systems.

The NB-IoT device 102 communicates with the OTA update server 104 to obtain updates via wireless communication through the mobile telecommunications network 106. The mobile telecommunications network 106 comprises a plurality of components for receiving, transmitting, processing, routing, switching, and otherwise facilitating electronic communications between connected devices. Although the mobile telecommunications network 106 primarily communicates with end node devices (e.g., NB-IoT devices 102) via wireless signals sent and received by radio access network components located at various sites, communications between components within the mobile telecommunications network 106 may occur via wired communication links. Additionally, external devices (e.g., the OTA update server 104 or the update provider 108) may connect to the mobile telecommunications network 106 via wired connections, such as via a wired connection to the Internet. The mobile telecommunications network 106 may be configured to transmit data according to various standards, including Long Term Evolution (LTE)/Evolved Universal Mobile Telecommunications System (UMTS) Terrestrial Radio Access Network (E-UTRAN) protocol or new radio (NR)/5G protocol.

The OTA update server 104 provides software or data updates to NB-IoT devices 102 via the mobile telecommunications network 106. Although the NB-IoT devices 102 communicate with the mobile telecommunications network 106 wirelessly, the OTA update server 104 is incorporated into or connected to the mobile telecommunications network 106 by wired connections for more efficient and reliable communication Like the NB-IoT device 102, the OTA update server 104 includes a controller 140 that stores and processes electronic data and a communication interface 150 that communicates with external computing devices (e.g., NB-IoT devices 102 and update providers 108) via the mobile telecommunications network 106. Similar to the controller 110, the controller 140 receives, processes, produces, transmits, and stores data. The controller 140 includes a memory 142, a processor 144, a RAM 146, and an I/O circuit 148, each configured and operating analogously to the corresponding components of the controller 110 described above. The OTA update server 104 also includes a communication interface 150 configured to send and receive communications between the OTA update server 104 and external computing devices via a data network connection (e.g., the mobile telecommunications network 106). Similar to the communication interface 130, the communication interface 150 may include software and hardware components configured to enable communication via the mobile telecommunications network 106 using standard or specialized communication protocols, via wired or wireless communication.

In some embodiments, the OTA server 104 may obtain update data from the update provider 108 via the mobile telecommunications network 106. The update provider may be a computing device associated with a mobile telecommunications network operator or a third party to provide updates to data or instructions of the NB-IoT device 102. Thus, the update provider may comprise a server configured to send instructions to perform NB-IoT OTA updates to the OTA update server 104 or to respond to requests for update data from the OTA update server 104. In some embodiments, the update provider 108 may comprise a client device configured to provide administrative or other user access to the OTA update server 104.

Figure 2:
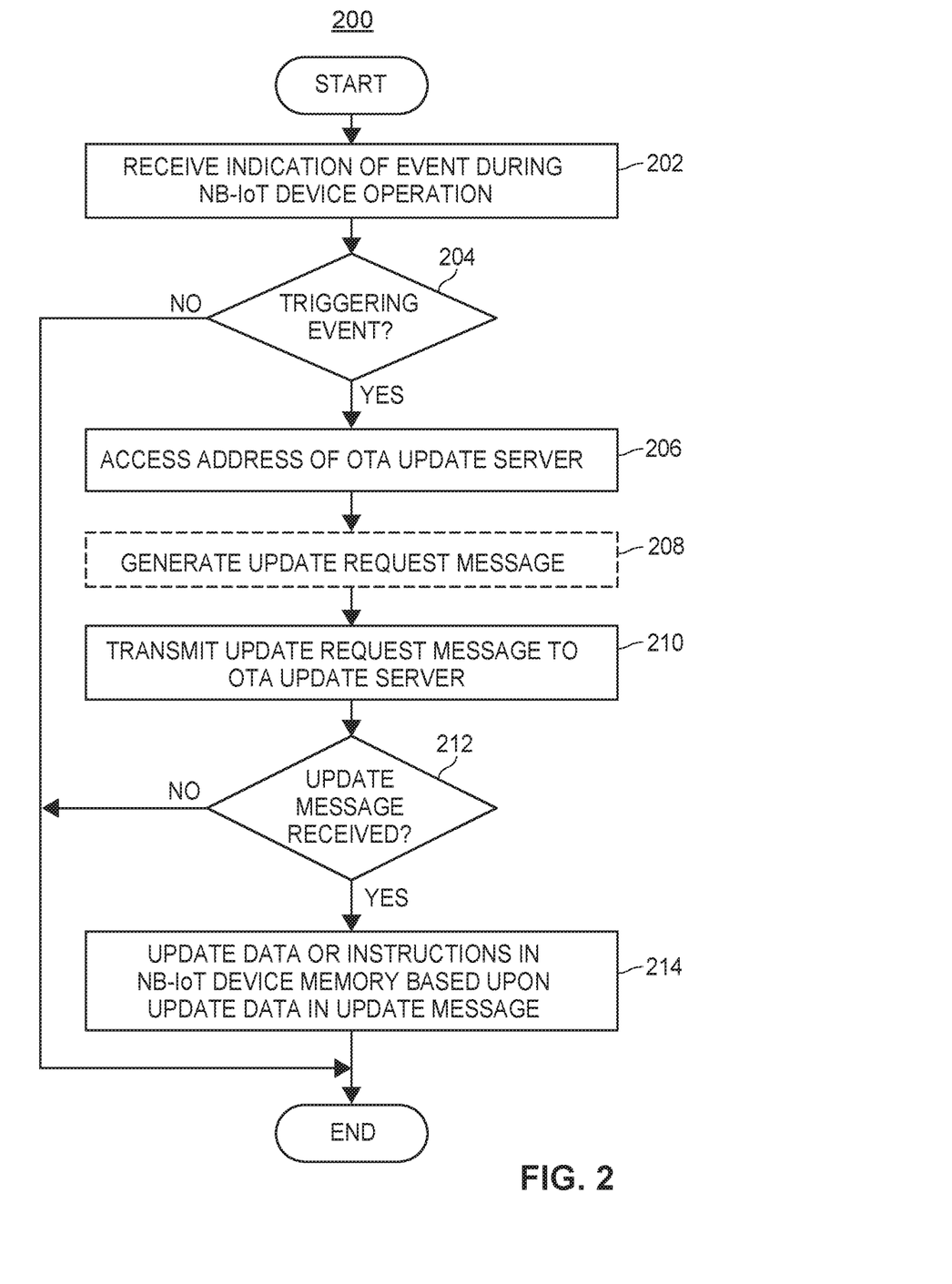
FIG. 2 illustrates a flow diagram of an exemplary NB-IoT OTA update method implemented by an NB-IoT device.

FIG. 2 illustrates a flow diagram of an exemplary NB-IoT OTA update method 200 implemented by an NB-IoT device 102. The NB-IoT OTA update method 200 may be performed by the processor 114 of the controller 110 of the NB-IoT device 102 executing software instructions (i.e., computer-readable instructions or machine-readable instructions) stored in the memory 112 or in the UICC memory 122. In some embodiments, the NB-IoT OTA update method 200 is performed by the processor 114 executing software instructions of an OTA update applet 124 stored in the UICC memory 122 of the UICC 120. In such embodiments, the OTA update applet 124 is configured to control the NB-IoT device 102 to perform part or all of the actions of the NB-IoT OTA update method 200 (e.g., determining the occurrence of a triggering event, generating an update request message in response to the triggering event, causing the transmission of the update request message to the OTA server 104, applying a received update). To enable OTA updates of the NB-IoT device 102, the OTA update applet 124 or other instructions for performing the NB-IoT OTA update method 200 are stored in the memory 112 or in the UICC memory 122 prior to provisioning the NB-IoT device 102 in an IoT system (e.g., prior to installing the NB-IoT device 102 or connecting the NB-IoT device 102 to the mobile telecommunications network 106). This may include storing the OTA update applet 124 in the UICC memory 122 prior to provisioning the UICC 120 in the NB-IoT device 102 (e.g., storing the OTA update applet 124 in the memory of a SIM card prior to installing the SIM card within the NB-IoT device 102).

The NB-IoT OTA update method 200 begins with receiving an indication of an event occurring during operation of the NB-IoT device 102 (block 202). When it is determined that the event is a triggering event (block 204), the address of the OTA update server 104 is accessed (block 206) for use in checking for updates. In some embodiments, an update request message is generated (block 208), which may include determining device parameters to include in the update request message. The update request message is then transmitted to the OTA update server 104 via the mobile telecommunications network by the communication interface 130 (block 210). If an update message from the OTA update server 104 is received by the communication interface 130 (block 212), the update data included in such update message is used to update information in the NB-IoT device 102 (block 214), ending the NB-IoT OTA update method 200. Additional or alternative aspects may be included in some embodiments.

At block 202, the controller 110 of the NB-IoT device 102 receives an indication of an event occurring at the NB-IoT device 102. Such event may include the NB-IoT device 102 powering up or waking from a low-power mode, executing a profile command, collecting data, receiving data from another device, transmitting data collected or received, detecting passage of a predetermined period of time, or other events occurring at the device. In some embodiments, the logic implementing the method may continuously or periodically monitor operation of the NB-IoT device 102 to detect occurrence of one or more types of events. Although it is usually sufficient to monitor only one type of event, some embodiments may include monitoring multiple types of events to determine whether to check for updates. The type of event or events to be monitored is predetermined and specified by the instructions implementing the method. When a monitored event occurs, the processor 114 may generate the indication of the event and provide such indication to a module performing further aspects of the NB-IoT OTA update method 200, such as an OTA update applet.

At block 204, the controller 110 determines whether a triggering event has occurred based upon the indication of the event, such as by determining whether the indicated event constitutes a triggering event for attempting an OTA update. Determining whether a triggering event has occurred based upon the indication of the event may include determining whether the event meets one or more criteria of a triggering event. Such criteria may include a number of occurrences of the event since the most recent attempt at an update, a time duration elapsed since the most recent attempt at an update, an attribute of the NB-IoT device 102 (e.g., whether a performance metric or operating status metric indicates adequate operational performance), availability of resources of the NB-IoT device 102 for communication and processing of updates (e.g., whether the device is currently transmitting/receiving data or whether device processor/memory utilization or availability relative to resource requirements is sufficient for performing an update), or a characteristic of the indicated event (e.g., a type of the event or whether a value of data collected or received by the device is above or below a threshold level). Thus, in some embodiments, determining the occurrence of the triggering event includes determining the NB-IoT device 102 has awoken a predetermined number of times (e.g., once, five times, or twenty times) since the transmission of a previous update request message from the NB-IoT device 102 to the OTA server 104. To implement such embodiments, an OTA applet or other software running on the NB-IoT device 102 may store a count in the memory 112 or UICC memory 122 of the number of wake event since the previous update request message. When the event is determined not to be a triggering event, the NB-IoT OTA update method 200 ends or returns to monitoring for further events until a triggering event occurs. When the event is determined to be a triggering event, the NB-IoT OTA update method 200 proceeds to attempt to update the NB-IoT device 102 (at blocks 206-214).

At block 206, after the occurrence of a triggering event has been determined, the controller 110 accesses an address of the OTA update server 104 from the memory 112 or UICC memory 122 for use in transmitting an update request message. Accessing the address of the OTA update server 104 may include accessing an address stored in a data file or an address stored as part of instructions for performing the NB-IoT OTA update method 200, such as an OTA update applet 124. In some embodiments, the address may be stored as read-only data to improve security by preventing redirection of update request messages to a third party server. In other embodiments, the address may be stored in a file that may be updated by the NB-IoT OTA update method 200 to improve flexibility in the updating process. The address may indicate the network location of the OTA update server 104 by an Internet Protocol (IP) address, Uniform Resource Locator (URL), or other such resource locator uniquely identifying the OTA update server.

At block 208, in some embodiments, the controller 110 generates an update request message for transmission to the OTA update server 104 to request available updates for the NB-IoT device 102. The update request message may include an identifier of the OTA update server 104 (e.g., the address of the server), an identifier of the NB-IoT device 102 (to facilitate a return message with an update), device parameters for the NB-IoT device 102, or other information relevant to determining whether an update is available for the NB-IoT device 102. In embodiments in which the NB-IoT device 102 uses UDP communication, including information regarding the version or previous update may be particularly useful because the OTA update server 104 may not otherwise be able to determine whether a previous update was received and applied. The device parameters may include indications of device type, indications of current versions of data, timestamps of a previous update request message or a previous update installation, integrated or connected components, locations or regions associated with the device, versions of software or data (e.g., applications, applets, libraries, or supporting data files), accounts associated with the device (e.g., client accounts associated with IoT devices, which may be used to determine updates), device operating status or statistics, or other information regarding the capabilities, characteristics, or operation of the NB-IoT device 102. Such device parameters may be static (determined prior to device deployment) or dynamic (determined during device operation, such as during generation of the update request message). As an alternative to generating the update request message, an update request message previously generated (e.g., a static update request message stored in the UICC memory 122 upon provisioning the UICC 120 in the NB-IoT device 102) may be accessed and transmitted to the OTA update server 104.

At block 210, the controller 110 causes the update request message to be transmitted via the mobile telecommunications network 106 to the OTA update server 104. To control such transmission, the controller 110 may send a command containing the generated or accessed update request message to the communication interface 130 for wireless transmission to the components of the mobile telecommunications network 106 (e.g., to a cell-site receiver of a local radio access network). In various embodiments, either or both of the controller 110 or the communication interface 130 may prepare the update request message for transmission according to relevant network protocols. In some embodiments, the update request message is transmitted as a UDP message to limit resource use by the NB-IoT device 102, as a result of which a confirmation or response from the OTA update server 104 may not be received.

At block 212, the controller 110 may wait for an update message from the OTA update server and determine whether such an update message has been received. Such update message or messages include update data from the OTA update server 104 for use in updating the information stored on the NB-IoT device 102. In some embodiments, the controller 110 may determine no update is available after a predetermined timeout threshold (e.g., one minute) in order to reduce the risk of accepting unauthorized updates from third parties. When no update message is received, the NB-IoT OTA update method 200 ends. When the controller 110 receives an update message from the OTA server 104 via the communication interface 130, the NB-IoT OTA update method 200 continues with performing the update.

At block 214, after an update message is received, the controller 110 updates the information stored on the NB-IoT device 102 based upon the update information in the update message. Such information may include data or instructions (e.g., software) stored in the memory 112 or UICC memory 122 of the NB-IoT device 102. The update data may include information regarding updates to software running on the NB-IoT device 102 to perform its operations, data used by the software, or communications-related software or data. In some embodiments, the update data may include changes to network connection lists, such as preferred network lists (e.g., a Public Land Mobile Network (PLMN) list stored as data 126 in the UICC 120) or forbidden network lists (e.g., a Forbidden PLMN (FPLMN) list stored as data 126 in the UICC 120). Updating such preferred network lists or forbidden network lists may avoid repeated failed connection attempts that would drain the battery of the NB-IoT device 102, particularly for NB-IoT devices 102 that change locations (e.g., IoT devices installed in or attached to moving objects).

In some instances, the update data may be a file or other separately stored data structure. For example, the update data may be a file containing a preferred network list or a forbidden network list in order to update the networks that may be used by the NB-IoT device 102 for telecommunications connections. In such instances, updating the information based upon the update data may comprise directly storing the received update data as a file or other separate structure in the memory 112 or UICC memory 122 (e.g., as new or replacement UICC data 126), which the controller 110 may extract from the update message. In other instances, the update data may include instructions requiring execution by the processor 114 to make changes to parts of files or instructions (e.g., software applications, routines, or applets). For example, the update data may include instructions to add or remove networks from a preferred network list or a forbidden network list stored in the UICC memory 122 (e.g., in a file in the UICC data 126). In such instances, the controller 110 may update the information based upon the update data by extracting the update data and executing commands to update parts of instructions or files stored in the memory 112 or UICC memory 122 (e.g., by adding, deleting, or replacing portions of the data in such files).

In some embodiments, the controller 110 may cause a confirmation message to be sent to the OTA update server 104 via the mobile telecommunications network 106 to confirm the NB-IoT device 102 has received the update message and successfully performed the update. After updating the information stored on the NB-IoT device 102, the NB-IoT OTA update method 200 ends.

Figure 3:
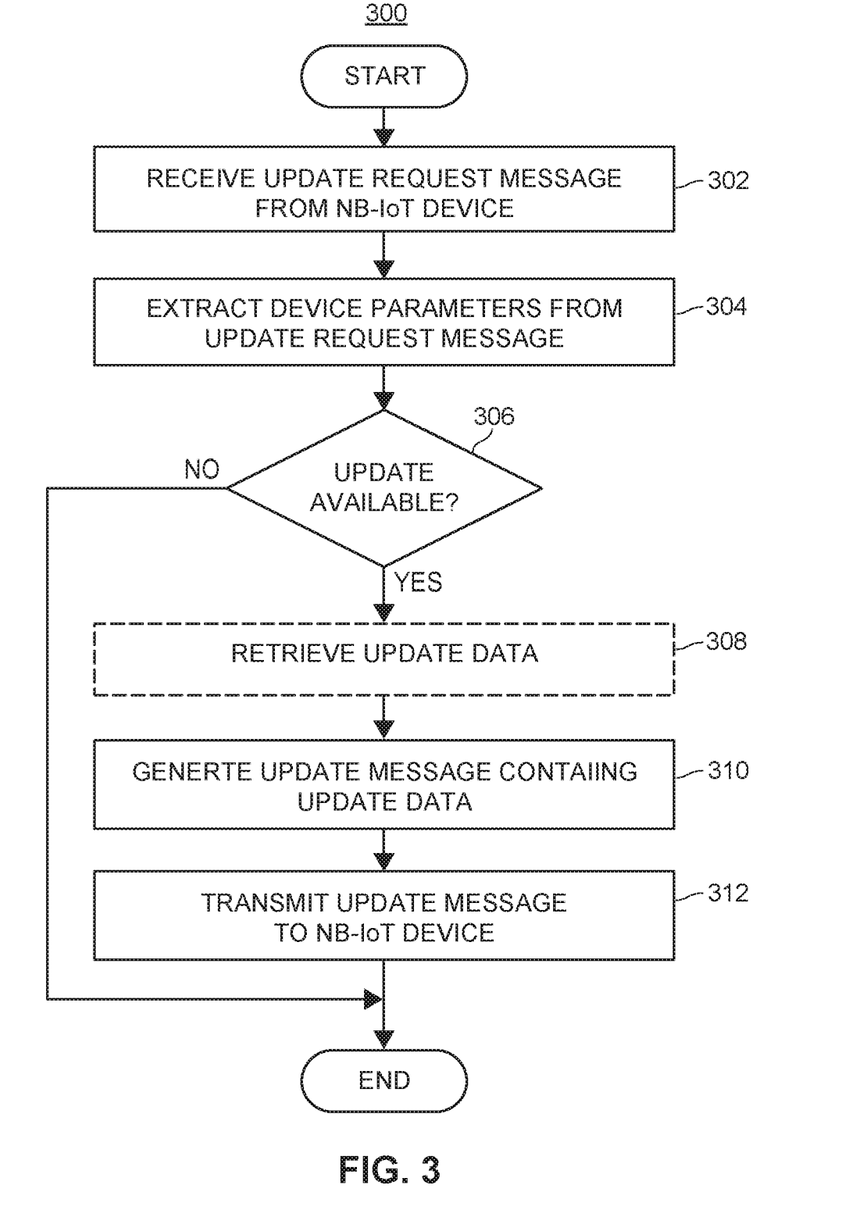
FIG. 3 illustrates a flow diagram of an exemplary update serving method implemented by an OTA update server.

FIG. 3 illustrates a flow diagram of an exemplary update serving method 300 implemented by an OTA update server 104. The update serving method 300 may be implemented by the processor 144 of the controller 140 of the OTA update server 104 to execute software instructions (i.e., computer-readable instructions or machine-readable instructions) stored in the memory 142 to provide OTA updates to NB-IoT devices, such as the NB-IoT device 102. To update the NB-IoT device 102, for example, the OTA update server 104 may exchange messages with the NB-IoT device 102 via the mobile telecommunications network 106. Although the OTA update server 104 is described herein as being communicatively connected to the mobile telecommunications network 106, it should be understood that the OTA update server 104 may be a component of the mobile telecommunications network 106.

The update serving method 300 begins with receiving an update request message from an NB-IoT device (block 302). Upon receiving such update request message, device parameters may be extracted from the update request message (block 304) for use in determining whether an update is available for the NB-IoT device. When it is determined that no update is currently available (block 306), the method ends. When it is determined that an update is available (block 306), the method proceeds to provide such update to the NB-IoT device. In some embodiments, update data for an available update may be retrieved from an update provider or other update data source (block 308). Once the update data has been obtained, an update message is generated containing the update data (block 310). After transmitting the update message to the NB-IoT device (block 312), the method may end. Although not required, a confirmation message may be received from the NB-IoT device and recorded for use in determining future updates. Additional or alternative aspects may be included in some embodiments.

At block 302, the OTA update server 104 may receive an update request message from the NB-IoT device 102 via the mobile telecommunications network 106. The update request message may be received via the communication interface 150 of the OTA update server 104. As discussed above, the update request message may include an identifier of the NB-IoT device 102, device parameters for the NB-IoT device 102, or other information relevant to determining whether an update is available for the NB-IoT device 102.

At block 304, the OTA update server 104 may extract device parameters from the received update request message. Such device parameters may be included in the update request message according to predefined categories of device information using a format predefined for update communications. Thus, the OTA update server 104 may parse the received update request message and extract the identifier and any device parameters.

At block 306, the OTA update server 104 may determine whether an update is available for the NB-IoT device 102 based upon the information extracted from the update request message (e.g., the device parameters). When no update is determined to be available for the NB-IoT device 102 (e.g., when no unapplied update is pending), the method may end. When an update is identified as being available, the method may continue with obtaining the update data and generating an update message.

To determine whether an update is available, the OTA update server 104 may determine whether an unapplied update is pending for the NB-IoT device 102 based upon the device parameters extracted from the update request message, such as device parameters indicating the device type or operating status of the NB-IoT device 102. In some embodiments, the OTA update server 104 may determine an unapplied update is pending based upon an indication of a version or a date of a previous update indicated by the device parameters. In further embodiments, the OTA update server 104 may determine an unapplied update is pending by checking an update table storing update or version status of a plurality of NB-IoT devices to determine the update status of the NB-IoT device 102. In further embodiments, the OTA update server 104 may determine an unapplied update is pending for the NB-IoT device based upon a time associated with the update, such that the update is sent in response to any update request message with corresponding device parameters (e.g., device type, account, or operating status) for a predetermined duration following initial receipt or deployment of the update (e.g., when the update is received from an update provider 108). In some embodiments, the OTA update server 104 may communicate with an update provider 108 to determine whether an update is available, which may include sending querying the update provider 108 for updates based upon device parameters extracted from the update request message and receiving a response from the update provider 108 indicating whether an update is available. Thus, the update provider 108 may maintain an update table containing update or version information for NB-IoT devices or accounts associated with NB-IoT devices.

At block 308, in some embodiments, the OTA update server 104 may retrieve update data after determining an update is available. The update data may be retrieved from the memory 142 or from a separate update provider 108. The update data may include files, instructions, or data sets to supplement, replace, or remove data or instructions already stored on the NB-IoT device 102. In some embodiments, for example, the update data may include a preferred network list or a forbidden network list (e.g., PLMN or FPLMN) for the NB-IoT device 102, which may be updated based upon a client account with a mobile telecommunications provider operating the mobile telecommunications network 106 (e.g., based upon update preferences set by the client in an account profile).

At block 310, the OTA update server 104 may generate an update message containing the update data to be sent to the NB-IoT device 102. The update message may be generated by formatting the update data in an appropriate manner to be received by the NB-IoT device 102 and adding addressing information to the message. In some embodiments, generating the update message may comprise simply addressing a previously stored update message to the NB-IoT device 102 for transmission over the mobile telecommunications network 106.

At block 312, the OTA update server 104 may transmit the update message containing the update data to the NB-IoT device 102 via the mobile telecommunications network 106. Transmitting the update message may include communicating the update message to the mobile telecommunications network 106 (or components thereof) via the communication interface 150 of the OTA update server 104. As noted above, in some embodiments, the OTA update server 104 may receive and record verification of update success as a confirmation message from the NB-IoT device 102 following successful updating of the data or instructions stored on the NB-IoT device 102. In other embodiments, no such confirmation message is expected or received. The method then ends.

Figure 4:
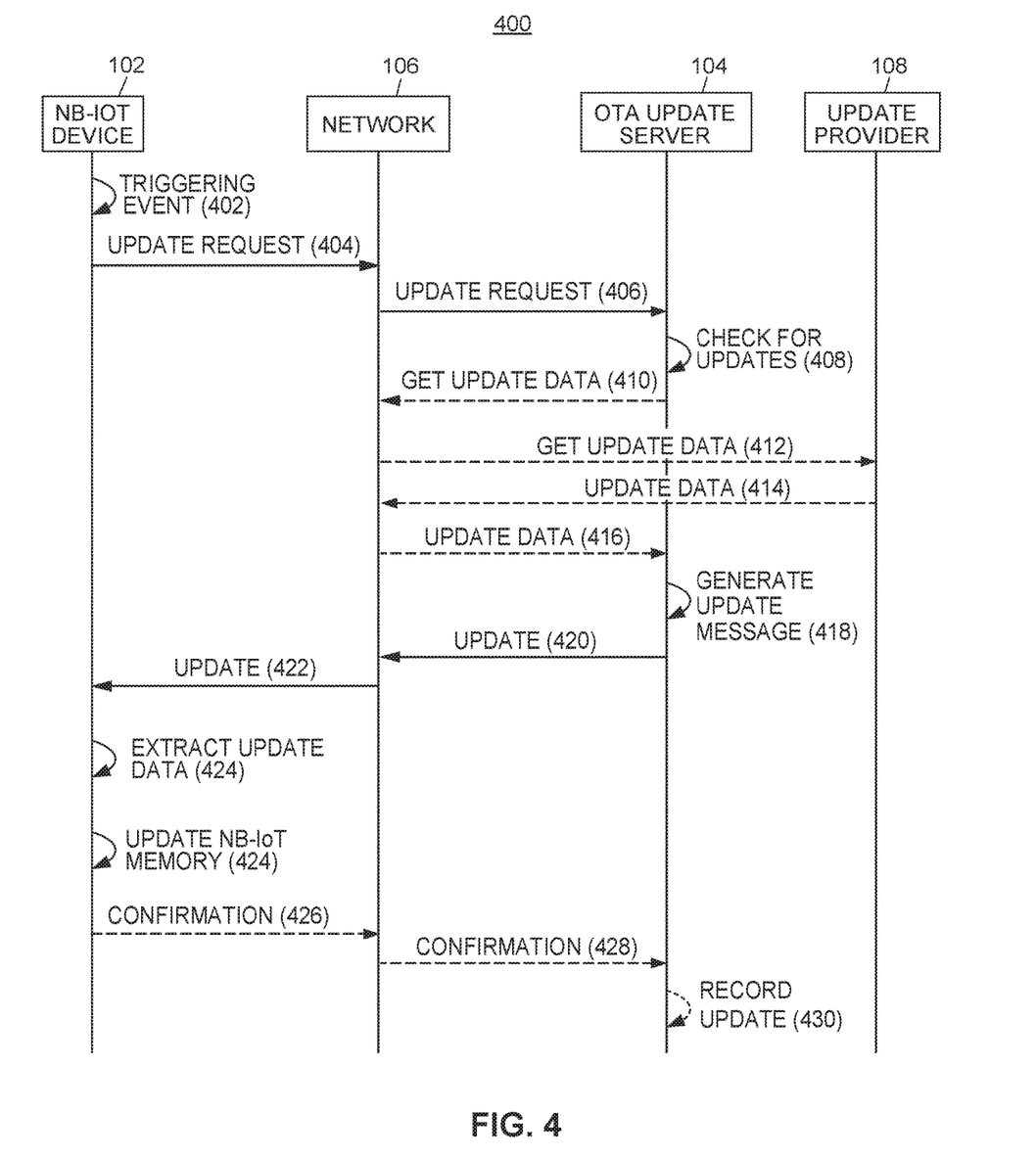
FIG. 4 illustrates a sequence diagram of an exemplary update process, showing communication between an NB-IoT device and an OTA update server.

FIG. 4 illustrates a sequence diagram of an exemplary update process 400, showing communication between an NB-IoT device 102 and an OTA update server 106 via a mobile telecommunications network 106. The exemplary update process 400 may be used to update the information stored at the NB-IoT device 102 (e.g., in the memory 112 or the UICC memory 122), according to the methods described above. Additional or alternative aspects may be included in some embodiments.

Upon detecting the occurrence of a triggering event at the NB-IoT device 102 (line 402), the NB-IoT device 102 sends an update request message (line 404) to the mobile telecommunications network 106, which routes the update request message (line 406) to the OTA update server 104. Upon receiving the update request message, the OTA update server 104 checks for updates for the NB-IoT device 102 (line 408). When the OTA update server 104 determines that an update is available for the NB-IoT device 102 (i.e., when an unapplied update is pending), the OTA update server prepares to send the update to the NB-IoT device 102.

In some embodiments, the OTA update server 104 may obtain the update from an update provider 108 by sending a get update data message (line 410) to the mobile telecommunications network 106, which routes the get update data message (line 412) to the update provider 108. The update provider 108 may then respond to the mobile telecommunications network 106 with an update data message (line 414), which routes the update data message (line 416) to the OTA update server 104. Thus, the OTA update server 104 may obtain the update data from the update provider 108 in such embodiments.

Once the OTA update server 104 has obtained the update data (from the update provider 108 or from a memory 142), the OTA update server 104 generates an update message to send to the NB-IoT device 102 (line 418). The OTA update server 104 then sends the update message (line 420) to the mobile telecommunications network 106, which routes the update message (line 422) to the NB-IoT device 102. Upon receiving the update message, the NB-IoT device 102 extracts the update data from the update message (line 424) and updates the memory 112 and/or UICC memory 122 based upon the update data (line 424).

In some embodiments, the NB-IoT device 102 may send a confirmation message (line 426) to the mobile telecommunications network 106, which routes the confirmation message (line 428) to the OTA update server 104. The OTA update server 104 may then record the update as being successfully for the NB-IoT device 102 (line 430). The process then ends.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for systems and methods according to the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the techniques disclosed herein without departing from the spirit and scope defined in the appended claims.

Although individual operations of one or more methods are illustrated and described as separate operations, one or more of the individual operations may be performed concurrently, and nothing requires that the operations be performed in the order illustrated. Structures and components presented as separate components in example configurations may be implemented as a combined structure or component. Similarly, structures and components presented as a single component may be implemented as separate components. These and other variations, modifications, additions, and improvements fall within the scope of the subject matter herein.

To the extent that any term recited in the claims at the end of this disclosure is referred to in this disclosure in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

What is claimed:

1. A method for over the air (OTA) updating of Narrowband Internet of Things (NB-IoT) devices over mobile telecommunications networks, comprising:
   storing, in a memory of the NB-loT device, an OTA update applet prior to provisioning the NB-IoT device;
   determining, by a processor of an NB-loT device executing the OTA update applet, occurrence of a triggering event;
   accessing, by the processor executing the OTA update applet from the memory of the NB-loT device, a network address of an OTA update server;
   transmitting, from the NB-loT device via a mobile telecommunications network, an update request message to the network address of the OTA update server;
   receiving, at the NB-IoT device via the mobile telecommunications network, an update message containing update data from the OTA update server; and
   updating, by the processor of the NB-IoT device, information stored in the memory of the NB-loT device based upon the update data received from the OTA update server.

2. The method of claim 1, wherein the NB-IoT device is configured without a short message service (SMS) interface capable of communication with a SMS center.

3. The method of claim 1, wherein the memory of the NB-loT device includes a subscriber identity module (SIM) card.

4. The method of claim 3, wherein the update information includes an update to a preferred network list or to a forbidden network list.

5. The method of claim 1, wherein determining the occurrence of the triggering event includes determining the NB-IoT device has awoken a predetermined number of times since transmission of a previous update request message.

6. The method of claim 1, further comprising:
   generating, by the processor of the NB-IoT device, the update request message, wherein the update request message includes one or more device parameters of the NB-IoT device.

7. The method of claim 1, further comprising:
   receiving, at the OTA update server via the mobile telecommunications network, the update request message;
   determining, by one or more processors of the OTA update server, an unapplied update is pending for the NB-IoT device based upon the update request message; and
   transmitting, from the OTA update server via the mobile telecommunications network, the update message containing the update data to the NB-IoT device.

8. A Narrowband Internet of Things (NB-IoT) device configured to receive over the air (OTA) updates over mobile telecommunications networks, comprising:
   a communication interface configured to send and receive messages via a mobile telecommunications network;
   a processor communicatively connected to the communication interface; and
   a memory communicatively connected to the storing executable instructions that, when executed by the processor, implement an OTA update applet stored in the memory prior to provisioning the NB-IoT device and configured to:
      determine an occurrence of a triggering event at the NB-IoT device;
      access a network address of an OTA update server stored in the memory;
      transmit an update request message to the network address of the OTA update server via the communication interface;
      receive an update message containing update data from the OTA update server via the communication interface; and
      update information stored in the memory based upon the update data received from the OTA update server.

9. The NB-IoT device of claim 8, wherein the communication interface is configured without a capability for communication with a short message service center (SMSC).

10. The NB-IoT device of claim 8, wherein the memory of the NB-loT device includes a subscriber identity module (SIM) card.

11. The NB-IoT device of claim 8, wherein the update information includes an update to a preferred network list or to a forbidden network list.

12. The NB-IoT device of claim 8, wherein the triggering event comprises the NB-loT device having awoken a predetermined number of times since transmission of a previous update request message.

13. A tangible, non-transitory computer-readable medium storing executable instructions comprising an OTA update applet stored in a memory of the NB-IoT device prior to provisioning of the NB-IoT device and configured for over the air (OTA) updating of Narrowband Internet of Things (NB-IoT) devices over mobile telecommunications networks that, when executed by one or more processors of a NB-IoT device, cause the NB-IoT device to:
   determine an occurrence of a triggering event at the NB-IoT device;
   access a network address of an OTA update server stored in a memory of the NB-IoT device;
   transmit an update request message to the network address of the OTA update server via a mobile telecommunications network;
   receive an update message containing update data from the OTA update server via the mobile telecommunications network; and
   update information stored in the memory based upon the update data received from the OTA update server.

14. The tangible, non-transitory computer-readable medium of claim 13, wherein the OTA update applet is configured to update the NB-IoT device without using short message service (SMS) communication.

15. The tangible, non-transitory computer-readable medium of claim 13, wherein the tangible, non-transitory computer-readable medium is a subscriber identity module (SIM) card configured to be removably installed within the NB-IoT device.

16. The tangible, non-transitory computer-readable medium of claim 13, wherein the triggering event comprises the NB-IoT device having awoken a predetermined number of times since transmission of a previous update request message.

17. The tangible, non-transitory computer-readable medium of claim 13, wherein the executable instructions further cause the NB-IoT device to:
   determine one or more device parameters of the NB-IoT device; and
   generate the update request message, wherein the update request message includes the one or more device parameters.

\* \* \* \* \*